United States Patent [19]

Koller

[11] 4,231,942
[45] Nov. 4, 1980

[54] STYRYL COMPOUNDS

[75] Inventor: Stefan Koller, Ramlinsburg, Switzerland

[73] Assignee: Ciba-Geigy Corporation, Ardsley, N.Y.

[21] Appl. No.: 20,109

[22] Filed: Mar. 12, 1979

[30] Foreign Application Priority Data

Mar. 21, 1978 [CH] Switzerland .......................... 3082/78

[51] Int. Cl.$^3$ ........................................... C07D 307/91
[52] U.S. Cl. ................................ 260/346.71; 260/315; 260/465 D; 260/465 E; 549/44; 564/341; 564/352
[58] Field of Search ............... 260/346.71, 329.3, 315, 260/465 D, 465 E

[56] References Cited

U.S. PATENT DOCUMENTS 3,920,720  11/1975  Beecken ........................... 260/465 E Primary Examiner—Henry R. Jiles
Assistant Examiner—Bernard Dentz
Attorney, Agent, or Firm—Prabodh I. Almaula

[57] ABSTRACT

There are described new styryl compounds of the formula $$\underset{X}{B} \underset{}{C} - Z - A - \underset{R_1}{N} - D - CH = C \underset{Y}{\overset{CN}{\diagup}} \quad (I)$$

in which
X is $=CH_2$, $-O-$, $-S-$ or the grouping $=NR_3$ wherein $R_3$ is hydrogen or an alkyl group having 1 to 4 carbon atoms,
Z is the $-O-$ or $-S-$ atom,
A is a straight-chain or branched-chain alkylene group having 2 to 4 carbon atoms,
$R_1$ is an unsubstituted or substituted alkyl group,
$R_2$ is hydrogen, $C_1$-$C_4$-alkyl, $C_1$-$C_4$-alkoxy, halogen or phenoxy, and
Y is $-CN$, $-COOR_4$, $-SO_2R_4$ or $CONR_3R_5$ wherein $R_3$ has the meaning given above, $R_4$ is a $C_1$-$C_4$-alkyl group or the phenyl group, $R_5$ is hydrogen or is the same as $R_4$, and the benzene rings B, C and D can be further substituted in particular by nonionic substituents, and also the production thereof and their use as dyes for dyeing and printing synthetic fibre materials, particularly those made from aromatic polyesters.

11 Claims, No Drawings

STYRYL COMPOUNDS

The present invention relates to new styryl compounds of the formula (I)

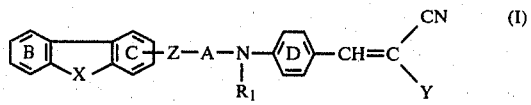

in which
X is =CH$_2$, —O—, —S— or the grouping =NR$_3$ wherein R$_3$ is hydrogen or an alkyl group having 1 to 4 carbon atoms, such as the methyl, ethyl, n- and iso-propyl or n-, sec- or tert-butyl group, X is preferably however the O atom;

Z is preferably the —O— or also the —S— atom,

A is a straight-chain or branched-chain alkylene group having 2 to 4 carbon atoms, such as the ethylene, n-propylene, iso-propylene, n-, sec- or tert-butylene group, preferably the C$_2$H$_4$ group, R$_1$ is a lower alkyl group which is unsubstituted or substituted by hydroxyl, cyano, phenyl or phenoxy, such as the methyl, ethyl, β-hydroxyethyl, β-cyanoethyl or n-propyl group, or the phenylmethyl, β-phenylethyl or β-phenoxyethyl group, preferably however it is an unsubstituted lower alkyl group, such as in particular the C$_2$H$_5$ group, R$_2$ is hydrogen, C$_1$–C$_4$-alkyl, C$_1$–C$_4$-alkoxy, halogen or phenoxy, and Y is —CN, —COOR$_4$, —SO$_2$R$_4$ or CONR$_3$R$_5$, wherein R$_3$ has the meaning given above, R$_4$ is a C$_1$–C$_4$-alkyl group or the phenyl group, R$_5$ is hydrogen or is the same as R$_4$, and the benzene rings B, C and D can be further substituted by in particular nonionic substituents; Y is preferably the —CN group.

In particularly interesting styryl compounds, Z is attached in the p-position to X.

As a C$_1$–C$_4$-alkyl group, R$_2$ is for example a methyl, ethyl, n- or iso-propyl group or n-, sec- or tert-butyl group, each of which is unsubstituted or is substituted by OH, CN, halogen or C$_1$–C$_4$-alkoxy. If R$_2$ is a C$_1$–C$_4$-alkoxy group or phenoxy group, this can likewise be further substituted for example by OH, CN, halogen, lower alkyl groups or lower alkoxy groups; in particularly interesting styryl compounds, R$_2$ is a C$_1$–C$_4$-alkyl group, especially the CH$_3$ group.

As a —COOR$_4$ group, Y is for example the carboxylic acid methyl, carboxylic acid ethyl, carboxylic acid propyl, carboxylic acid butyl or carboxylic acid phenyl ester group. If Y is the —SO$_2$R$_4$ group, it is for example the —SO$_2$CH$_3$, —SO$_2$C$_2$H$_5$, —SO$_2$C$_3$H$_7$, —SO$_2$C$_4$H$_9$ or —SO$_2$C$_6$H$_5$ group. If Y is the CONR$_3$R$_5$ group, it is for example the —CONH$_2$, —CONHCH$_3$, —CONHC$_2$H$_5$, —CONHC$_3$H$_7$, —CON(CH$_3$)$_2$, —CON(C$_2$H$_5$)$_2$, —CON(CH$_3$)(C$_2$H$_5$), —CON(CH$_3$)(C$_6$H$_5$) or —CONHC$_6$H$_5$ group.

The benzene rings B, C and/or D can be further substituted in particular by nonionic substituents. As substituents are mentioned for example: alkyl and alkoxy groups having 1 to 4 carbon atoms, halogen such as fluorine, chlorine or bromine, CN, NO$_2$, —SO$_2$-alkyl, —SO$_2$NH$_2$, —SO$_2$NH-alkyl(C$_1$–C$_4$), —SO$_2$N(alkyl-C$_1$–C$_4$)$_2$ or the —COO—alkyl-(C$_1$–C$_4$) group. In preferred styryl compounds, the benzene rings B, C and D are not further substituted.

Of interest are styryl compounds of the formula (Ia)
Of interest are styryl compounds of the formula (Ia)

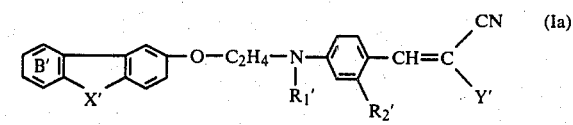

in which
X' is the —O— or —S— atom or the group >N—CH$_3$,

R$_1$' is a C$_1$–C$_4$-alkyl group which can be further substituted by phenyl or phenoxy, R$_2$' is CH$_3$, OCH$_3$ or Cl, Y' is CN, COOCH$_3$, COOC$_6$H$_5$, SO$_2$C$_6$H$_5$, CONHC$_6$H$_5$ or CON(CH$_3$)$_2$, and the benzene ring B' can be further substituted by methyl or chlorine.

The styryl compounds of the formulae I and Ia are new compounds free from water-solubilising groups, and are distinguished by their difficult solubility in water and by their good pH stability.

These styryl compounds are produced in a manner known per se by, for example, reacting aldehydes of the formula

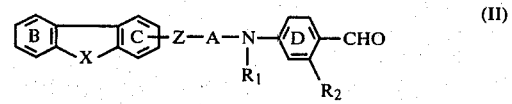

with methylene-active compounds of the formula (III)

in which formulae, the symbols X, Z, A, R$_1$, R$_2$, Y, B, C and D have the meanings given at the beginning.

The reaction is performed at temperatures between 20° and 160° C., preferably in the temperature range of 50° to 120° C., in the melt or preferably in a solvent which is inert under the reaction conditions. As suitable solvents are mentioned for example: aliphatic alcohols having 1 to 4 carbon atoms, such as methanol, ethanol, propanols and butanols, also benzene, toluene, xylene, monochlorobenzene, dichlorobenzenes, chloroform, dimethylformamide, dimethyl sulfoxide and acetonitrile. Basic catalysts can be added to accelerate the reaction, such as ammonia, diethylamine, triethylamine, piperidine, morpholine, N-ethylpiperidine, N-methylmorpholine, alkali carbonates, alkali acetates, basic ion exchanger resins, acetates of ammonia and of organic bases, such as ammonium acetate or piperidine acetate. The reaction can however also be performed in the presence of acetic acid and even in glacial acetic acid as solvent.

The aldehydes of the formula (II) are new and are intermediates. These aldehydes are produced by starting with compounds of the formula (IV)

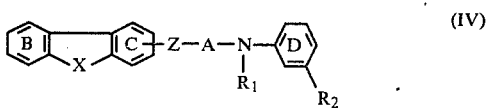 (IV)

in which the symbols B, C, D, X, Z, $R_1$ and $R_2$ have the meanings given under the formula (I). These compounds of the formula (IV) are reacted, in a manner known per se, with so-called Vilsmeier reagents, that is to say, mixtures of N-formyl compounds of the formula

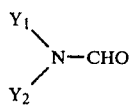

in which $Y_1$ and $Y_2$ independently of one another are each a lower alkyl group (for example dimethylformamide), and inorganic acid halides, preferably phosphorus oxychloride, thionyl chloride or phosgene. The compounds of the formula (IV) can on the other hand be produced by several methods known per se. Reference is made in this respect for example to German Offenlegungsschrift No. 2,316,766.

In the reaction sequence of the aldehydes of the formula (II) with the methylene-active compound of the formula (III), it is however also possible to dispense with isolation of the aldehydes of the formula (II), and to use these, after decomposition of unreacted Vilsmeier reagent by means of lower aliphatic alcohols and adjustment of the pH value to about 6.5-8.5, directly and without isolation for the condensation reaction with the methylene-active compound of the formula (III). The presence here of an emulsifying additive, for example of oxethylation products of higher alcohols or of substituted phenols, can be useful, especially when aqueous alkali or aqueous ammonia is used for adjusting the pH value.

The methylene-active compounds of the formula (III) are known. Suitable compounds are for example malonic acid dinitrile, cyanoacetic acid methyl ester, cyanoacetic acid ethyl ester, cyanoacetic acid propyl ester, cyanoacetic acid butyl ester, cyanoacetic acid phenyl ester, cyanacetamide, cyanoacetic acid-N-methyl amide, cyanoacetic acid-N,N-dimethyl amide, cyanoacetic acid anilide, phenylsulfonylacetonitrile, methylsulfonylacetonitrile, ethylsulfonylacetonitrile, n- or iso-propylsulfonylacetonitrile and n-, iso- or tert-butylsulfonylacetonitrile.

The new styryl compounds of the formula (I) according to the invention are excellently suitable as dyes for dyeing, padding or printing of fibres, filaments or fleeces, fabrics or knitted goods of synthetic fibre materials, particularly knitted goods made from linear aromatic polyesters, for example those made from terephthalic acid and glycols, especially ethylene glycol or condensation products made from terephthalic acid and 1,4-bis-(hydroxymethyl)-hexahydrobenzene; polycarbonates, for example those made from α,α-dimethyl4,4'-dihydroxy-diphenylmethane and phosgene, esters of cellulose, for example cellulose triacetate, and fibres based on polyvinyl chloride.

The dyes are applied by the known dyeing processes, for example in the exhaust process as aqueous dispersions in the presence of customary anionic or nonionic dispersing agents and optionally customary swelling agents (carriers), at temperatures, in regard to polyester materials, between 80° and 125° C., or in the absence of a carrier under pressure at about 100° to 140° C. (HT process). Cellulose 2½ acetate is preferably dyed between about 65° and 85° C., and cellulose triacetate at temperatures up to 115° C. The dyes are also suitable for dyeing by the known thermosol process. Wool and cotton simultaneously present in the dye bath are not dyed at all or only very slightly dyed by the dyes of the present invention, so that the dyes are well applicable for dyeing polyester/wool and polyester/cellulose fibre mixed fabrics. They moreover have good solubility in many organic solvents, such as perchloroethylene, and can therefore be used for dyeing lacquers, oils, plastics, such as polystyrene and polyethylene, in the melt, and fibres, using the customary dope dyeing processes; furthermore, they can be used in the transfer printing process.

Before they are used, it is advantageous to convert the dyes into dye preparations. For this purpose, they are ground so that their mean particle size is between 0.01 to 10 microns. The grinding can be performed in the presence of dispersing agents. For example, the dried dye is ground with a dispersing agent, or is kneaded in paste form with a dispersing agent, and subsequently dried in vacuo or by spray drying. After the addition of water, it is possible with the preparations thus obtained to dye, pad or print.

In the case of padding and printing, the customary thickening agents will be used, for example modified or unmodified natural products, for example alginates, British gum, gum arabic, crystal gum, locust bean flour, tragacanth, carboxymethylcellulose, hydroxyethylcellulose, starch or synthetic products, for example polyacrylic amides or polyvinyl alcohols.

The dyes according to the invention impart to the stated hydrophobic materials clear greenish-yellow shades having very good fastness properties, such as fastness to light, and good fastness to washing and to sublimation.

The invention relates also to aldehydes of the formula

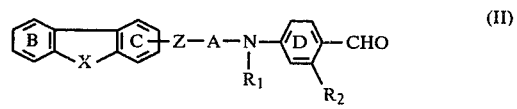 (II)

in which
X is $=CH_2$, —O—, —S— or the grouping $=NR_3$, wherein $R_3$ is hydrogen or an alkyl group having 1 to 4 carbon atoms,
Z is the —O— or —S— atom,
A is a straight-chain or branched-chain alkylene group having 2 to 4 carbon atoms,
$R_1$ is an unsubstituted or substituted alkyl group,
$R_2$ is hydrogen, $C_1$-$C_4$-alkyl, $C_1$-$C_4$-alkoxy, halogen or phenoxy,
and in which the benzene rings B, C and D can be further substituted, particularly by nonionic substituents, with the meaning of the symbols being identical to that given under the formula (I), and also to the use of the aldehydes for producing styrene compounds.

Except where otherwise stated in the following Examples, which further illustrate the invention but which do not limit its scope to them, 'part' denote parts by weight, and the temperatures are given in degrees Centigrade.

EXAMPLE 1

18.6 of the aldehyde of the formula

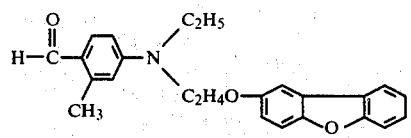

4.6 of malonic acid dinitrile and 0.2 g of piperidine are dissolved in 150 ml of methanol, and the reaction mixture is kept at 50° for 2 hours. After this time, the formed styryl compound has precipitated as oil. The mother liquor is removed by decanting, and the residue is recrystallised from ethyl acetate. The yield is 14 g of the styryl compound of the formula

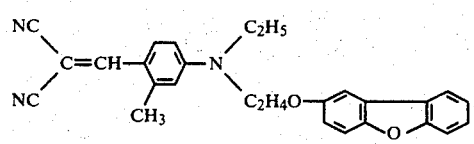

in the form of yellow crystals having a melting point of 140°.

As a dye applied from an aqueous dispersion, this styryl compound dyes polyethylene glycol terephthalate fibres in greenish-yellow shades. The dyeings have very good fastness to light and to sublimation. The hydrolysis stability of the product during the dyeing process is still very good even at pH values of 7 and 8.

The aldehyde used as starting material is produced by reacting N-ethyl-N-β-chloroethyl-m-toluidine in dimethylformamide with an equivalent amount of 3-oxyphenylene oxide, with the addition of one equivalent of sodium hydroxide. The resulting product is subsequently converted under the known conditions of the Vilsmeier synthesis, by means of phosphorus oxychloride in dimethylformamide, into the aldehyde.

There are produced by the procedure described in the foregoing also the styryl compounds listed in the following Table, the shade of dyeing produced by them on polyethylene glycol terephthalate being shown in the last column of the Table.

TABLE $$R-O-C_2H_4\diagdown N-\bigcirc\!\!\!\!-CH=C\diagup^{CN}_{Y}$$
$$R_1\diagup\quad R_2$$

| Ex. No. | R | $R_1$ | $R_2$ | Y | Shade on polyethylene glycol terephthalate |
|---|---|---|---|---|---|
| 2 | dibenzofuranyl | —CH₃ | —CH₃ | CN | greenish yellow |
| 3 | " | —CH₂C₆H₅ | " | " | " |
| 4 | " | —C₂H₄C₆H₅ | " | " | " |
| 5 | " | n-C₄H₉ | " | " | " |
| 6 | " | —C₂H₄OC₆H₅ | " | " | " |
| 7 | " | —C₂H₅ | Cl | " | " |
| 8 | " | " | OCH₃ | " | yellow |
| 9 | " | " | —CH₃ | COOCH₃ | greenish yellow |
| 10 | " | " | " | COOC₆H₅ | " |
| 11 | " | " | " | SO₂C₆H₅ | " |
| 12 | " | " | " | CONHC₆H₅ | " |
| 13 | " | " | " | CON(CH₃)₂ | " |
| 14 | " | " | " | —CN | " |
| 15 | dibenzothiophenyl | " | " | " | " |
| 16 | N-methylcarbazolyl | " | " | " | " |
| 17 | methyl-dibenzofuranyl | " | " | " | " |
| 18 | methyl-dibenzofuranyl | " | " | " | " |
| | chloro-dibenzofuranyl | | | | |

EXAMPLE 19

2 Parts of the dye obtained according to Example 1 are dispersed in 4000 parts of water. To this dispersion are added 12 parts of the sodium salt of o-phenylphenol and 12 parts of diammonium phosphate, and 100 parts of polyethylene glycol terephthalate yarn are dyed for 90 minutes at 95° to 98° in this liquor. The dyeing is rinsed and subsequently treated with aqueous sodium hydroxide solution and a dispersing agent. A greenish-yellow dyeing having fastness to light and to sublimation is thus obtained.

EXAMPLE 20

In a pressure dyeing apparatus, 2 parts of the dye obtained according to Example 1 are finely suspended in 2000 parts of water containing 4 parts of oleyl polyglycol ether. The pH value of the dye bath is adjusted to 4 to 5 with acetic acid. 100 parts of fabric made from polyethylene glycol terephthalate are introduced into the bath at 50°; the bath is then heated within 30 minutes to 140°, and dyeing is performed for 50 minutes at this temperature. The dyeing is subsequently rinsed with water, soaped and dried. A greenish-yellow dyeing having fastness to light and to sublimation is obtained.

EXAMPLE 21

Polyethylene glycol terephthalate fabric is impregnated at 40° on a padding machine with a liquor of the following composition:

20 parts of the dye obtained according to Example 1, finely dispersed in
10 parts of sodium alginate,
20 parts of triethanolamine,
20 parts of octylphenol polyglycol ether, and
930 parts of water.

The fabric, squeezed out to about 100%, is dried at 100°, and subsequently fixed for 30 seconds at a temperature of 210°. The dyed material is rinsed with water, soaped and dried. A greenish-yellow dyeing having fastness to light and to sublimation is obtained.

What is claimed is:

1. A styryl compound of the formula (I)

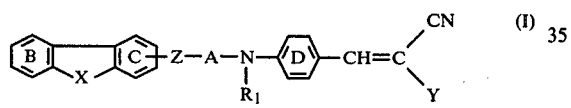

in which
X is =CH$_2$, —O—, —S— or the grouping =NR$_3$ wherein R$_3$ is hydrogen or an alkyl group having 1 to 4 carbon atoms,
Z is the —O— or —S— atom,
A is a straight-chain or branched-chain alkylene group having 2 to 4 carbon atoms,
R$_1$ is lower alkyl unsubstituted or substituted by hydroxy, cyano, phenyl or phenoxy,
R$_2$ is hydrogen, C$_1$-C$_4$-alkyl unsubstituted or substituted by OH, CN, halogen or C$_1$-C$_4$-alkoxy, C$_1$-C$_4$-alkoxy unsubstituted or substituted by OH, CN, halogen, lower alkyl or lower alkoxy, halogen or phenoxy unsubstituted or substituted by OH, CN, halogen, lower alkyl or lower alkoxy, and
Y is —CN, —COOR$_4$, —SO$_2$R$_4$ or CONR$_3$R$_5$, wherein R$_3$ has the meaning given above, R$_4$ is C$_1$-C$_4$-alkyl group or the phenyl group, R$_5$ is hydrogen or is the same as R$_4$,
and the benzene rings B, C and D can be further substituted by alkyl of 1 to 4 carbon atoms, alkoxy or 1 to 4 carbon atoms, halogen, —CN, —NO$_2$, —SO$_2$-alkyl, —SO$_2$NH$_2$, —SO$_2$NH-alkyl (C$_1$-C$_4$), —SO$_2$N (alkyl-C$_1$-C$_4$)$_2$ or —COO-alkyl-(C$_1$-C$_4$).

2. A styryl compound according to claim 1, wherein Z is attached in the p-position to X.

3. A styryl compound according to claim 1, wherein the benzene rings B, C and D are not further substituted.

4. A styryl compound according to claim 1, wherein X is the —O— atom.

5. A styryl compound according to claim 1, wherein Z is the —O— atom.

6. A styryl compound according to claim 1, wherein A is the —C$_2$H$_4$ group.

7. A styryl compound according to claim 1, wherein R$_1$ is an unsubstituted alkyl group, particularly the C$_2$H$_5$ group.

8. A styryl compound according to claim 1, wherein R$_2$ is a C$_1$-C$_4$-alkyl group, particularly the CH$_3$ group.

9. A styryl compound according to claim 1, wherein Y is the CN group.

10. A styryl compound according to claim 1, which compound corresponds to the formula (Ia)

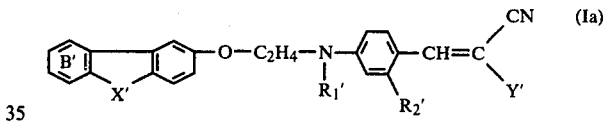

in which
X' is the —O— or —S— atom or the group >NCH$_3$,
R$_1$' is a C$_1$-C$_4$-alkyl group which can be further substituted by phenyl or phenoxy,
R$_2$' is CH$_3$, OCH$_3$ or Cl,
Y' is CN, COOCH$_3$, COOC$_6$H$_5$, SO$_2$C$_6$H$_5$, CONHC$_6$H$_5$ or CON(CH$_3$)$_2$,
and the benzene ring B' can be further substituted by methyl or chlorine.

11. A styryl compound according to claim 1, which compound corresponds to the formula

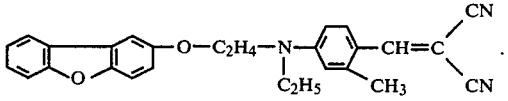

* * * * *

UNITED STATES PATENT AND TRADEMARK OFFICE
CERTIFICATE OF CORRECTION

PATENT NO. : 4,231,942
DATED : November 4, 1980
INVENTOR(S) : Stefan Koller

It is certified that error appears in the above-identified patent and that said Letters Patent are hereby corrected as shown below:

Claim 1, column 7, line 35, structure reads,

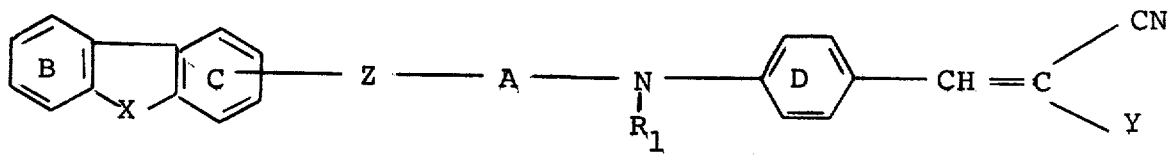

should read --

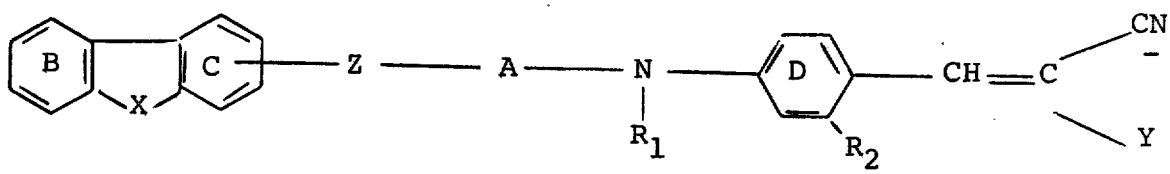

Signed and Sealed this

Twenty-fourth Day of March 1981

[SEAL]

Attest:

RENE D. TEGTMEYER

Attesting Officer   Acting Commissioner of Patents and Trademarks